(12) United States Patent
Chen

(10) Patent No.: US 11,833,408 B2
(45) Date of Patent: Dec. 5, 2023

(54) WEIGHT TRAINING DEVICE THAT CAN BE TRANSFORMED INTO A HAND TRUCK

(71) Applicant: Ya-Chi Chen, New Taipei (TW)

(72) Inventor: Ya-Chi Chen, New Taipei (TW)

( * ) Notice: Subject to any disclaimer, the term of this patent is extended or adjusted under 35 U.S.C. 154(b) by 4 days.

(21) Appl. No.: 17/592,009

(22) Filed: Feb. 3, 2022

(65) Prior Publication Data

US 2023/0241478 A1    Aug. 3, 2023

(51) Int. Cl.
  *A63B 71/00*    (2006.01)
  *B62B 1/00*    (2006.01)
  *A63B 22/20*    (2006.01)
  *A63B 23/04*    (2006.01)

(52) U.S. Cl.
  CPC .......... *A63B 71/0036* (2013.01); *A63B 22/20* (2013.01); *A63B 23/047* (2013.01); *B62B 1/002* (2013.01); *A63B 2210/50* (2013.01)

(58) Field of Classification Search
  CPC ... A63B 22/20; A63B 22/2021; A63B 22/203; A63B 22/208; A63B 71/0036
  See application file for complete search history.

(56) References Cited

U.S. PATENT DOCUMENTS

| | | | | |
|---|---|---|---|---|
| 4,477,074 A * | 10/1984 | Bushnell | ............... | A63B 21/078 482/106 |
| 5,810,697 A * | 9/1998 | Joiner | ................... | A63B 23/047 482/68 |
| 6,761,650 B1 * | 7/2004 | Dettmann | ............... | A63B 69/34 473/445 |
| 7,156,782 B1 * | 1/2007 | Krull | .................... | A63B 21/4029 482/106 |
| D606,611 S * | 12/2009 | Rogers | .......................... | D21/698 |
| 8,617,007 B2 * | 12/2013 | Gilman | ............... | A63B 69/0071 473/445 |
| D851,186 S * | 6/2019 | Kuka | ........................... | D21/691 |
| 10,398,927 B2 * | 9/2019 | Baumler | ............. | A63B 21/0004 |
| 10,874,897 B1 * | 12/2020 | Eastham, Jr. | .......... | A63B 22/20 |
| D924,342 S * | 7/2021 | Bentley | ......................... | D21/686 |
| 11,179,591 B1 * | 11/2021 | Bazargan | ............... | A63B 69/34 |
| D941,940 S * | 1/2022 | McIntyre | ..................... | D21/686 |
| 2017/0189733 A1 * | 7/2017 | Bentley | ................ | A63B 23/047 |
| 2020/0101346 A1 * | 4/2020 | Chen | .................... | A63B 21/4029 |
| 2020/0238127 A1 * | 7/2020 | Wehrell | ................. | A63B 21/40 |

* cited by examiner

*Primary Examiner* — Loan B Jimenez
*Assistant Examiner* — Zachary T Moore
(74) *Attorney, Agent, or Firm* — Egbert, McDaniel & Swartz, PLLC

(57) ABSTRACT

Disclosed is a weight training device that can be transformed into a hand truck. The device includes a main frame, two first wheels, a second wheel, two first installing tubes, two second installing tubes and two operating parts, wherein the main frame is used for loading at least one heavy object. Each wheel is fitted on the main frame in a rotational manner, so that the main frame can be moved through the rolling of the wheels. Each of the first installing tubes are opposite each other and respectively extends upward. Each of the second installing tubes are opposite each other and respectively extend away from the main frame. Each of the operating parts are opposite each other in the lateral direction and are respectively and selectively configured on each of the first or each of the second installing tubes, so as to shift the operating mode of weight training.

8 Claims, 13 Drawing Sheets

WEIGHT TRAINING DEVICE THAT CAN BE TRANSFORMED INTO A HAND TRUCK

CROSS-REFERENCE TO RELATED U.S. APPLICATIONS

Not applicable.

BACKGROUND OF THE INVENTION

1. Field of the Invention

The present invention relates generally to a weight training device, and more particularly to a weight training device that can be transformed into a hand truck.

2. Description of Related Art Including Information Disclosed Under 37 CFR 1.97 And 37 CFR 1.98

A weight training sled is a device used for weight training. It mainly includes a sliding plate that can be loaded with heavy objects. The heavy objects can be cast iron discs. The user pushes or pulls the sliding plate. The friction between the sliding plate and the ground forms a resistance force. In this way, the user can carry out weight training. By changing the number of the heavy objects, the strength for training can be adapted. When pushing or pulling the sliding plate, there will be abrasion and wearing between the sliding plate and the ground. Therefore, weight training sleds are not suitable for indoor use.

Due to the problem of the above-mentioned weight training sleds, some manufacturers have produced a new type of weight training sleds installed with wheels. The sliding plate is fitted with four wheels. As the sliding plate can be moved through the wheels, there is no contact and wearing between the sliding plate and the ground. Therefore, it is suitable for indoor use. The weight training sled with wheels can be further configured with a damping structure. When the wheels roll on the ground, the damping structure provides a resistance. The heavy object loaded on the sliding plate is the source of the resistance against the movement. The sliding plate is provided with two vertical holding bars so that the user can grip the bars with both hands to apply a force to push or pull the weight training sled.

The prior-art weight training sled only provides the user with holding bars for the user to grip the bars with both hands to push or pull the whole weight training sled. It only provides limited training forms, with insufficient diversity.

BRIEF SUMMARY OF THE INVENTION

The main object of the present invention is to provide a weight training device that can be transformed into a hand truck and simultaneously applying resistance to the wheels of the hand truck for more versatile training functions. It aims to make a breakthrough by solving the technical problems in developing an ideal and practical structural design for new-style weight training devices.

Based on the above object, the present invention provides a weight training device that can be transformed into a hand truck, which includes:

a main frame, one end of the main frame is first end, the other end of the main frame is second end, the first end and the second end are opposite each other, the main frame is used to load at least one heavy objects;

two first wheels are configured on both sides of the first end, capable of rotation, and the first wheels are opposite each other;

a second wheel, configured on the second end, capable of rotation, the main frame can be moved through the rolling of the first wheel and the second wheel;

two first installing tubes, configured opposite each other in the lateral direction, the bottom end of each first installing tube is connected to the first end, the top end of each first installing tube extends upward and its tip end is open;

two second installing tubes, configured opposite each other in the lateral direction, one end of each second installing tube is connected to the first end, and the other end of each second installing tube extends away from the main frame with its tip end open;

two operating parts, configured opposite each other, each operating part respectively includes an inserting portion and a first operating portion, wherein the inserting portion and the first operating portion are coupled together, the inserting portion is used to for insertion into each first installing tube or each second installing tube, so that the operating part can respectively and selectively configured on each first installing tube or each second installing tube, for different forms of weight training; and a damping structure, configured on the main frame, the damping structure is connected to the second wheel, so as to provide resistance against the rotation of the second wheel.

Compared with the prior art, the present invention can be used for different forms of training by installing the operating part on the first installing tubes or the second installing tubes, and selectively controlling the first operating portion or the second operating portion to execute multiple forms of weight training. Therefore, it is a practical invention.

DETAILED DESCRIPTION OF THE INVENTION

Figure 1:
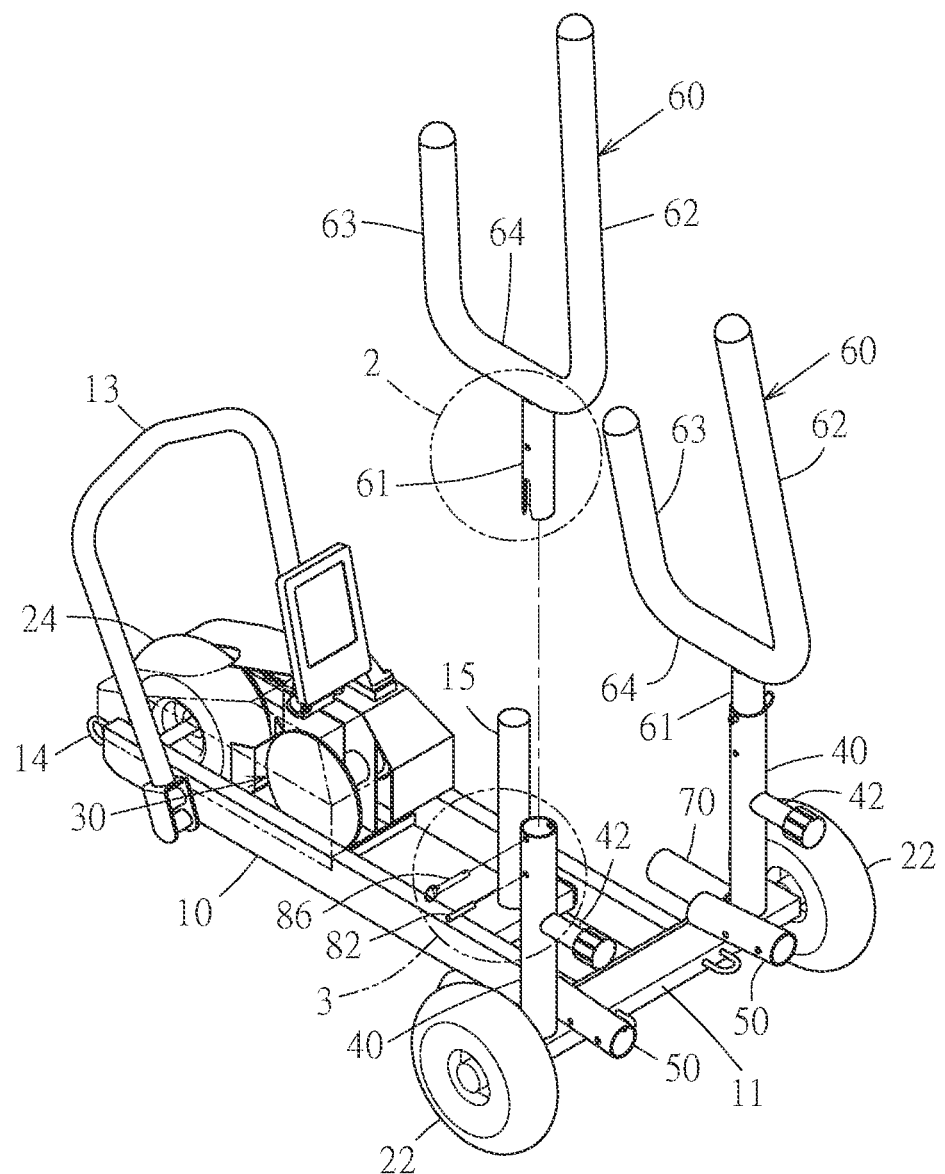
FIG. 1 is a partial exploded perspective view of a preferred embodiment of the present invention, showing the usage state of the operating part installed on the first installing tube.
Figure 2:
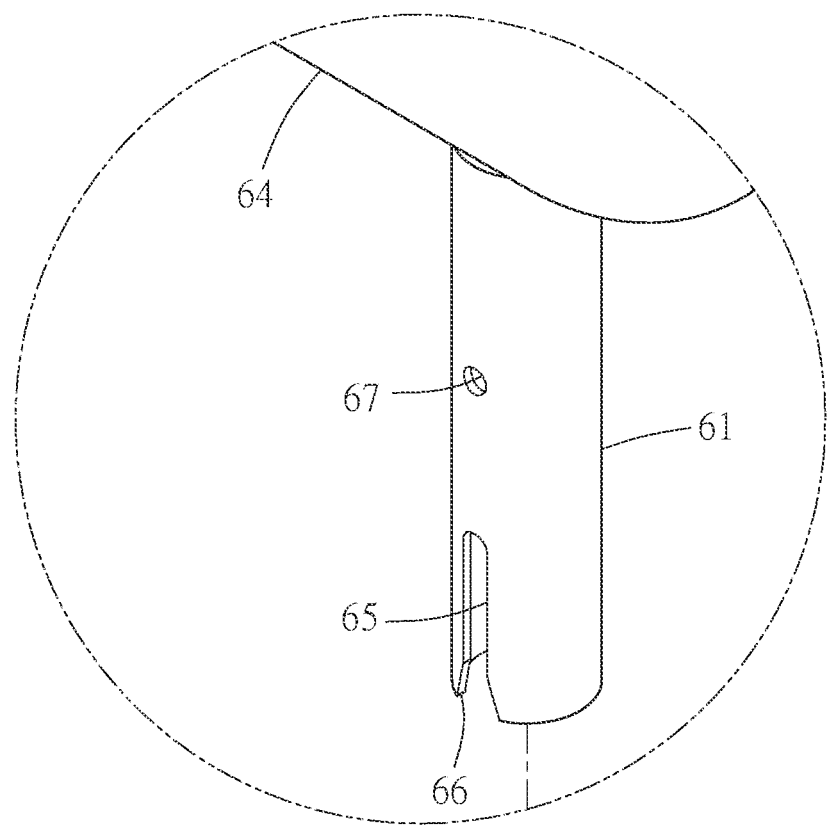
FIG. 2 is a partial enlarged view of FIG. 1, showing the portion of the operating part formed with a slot.
Figure 3:
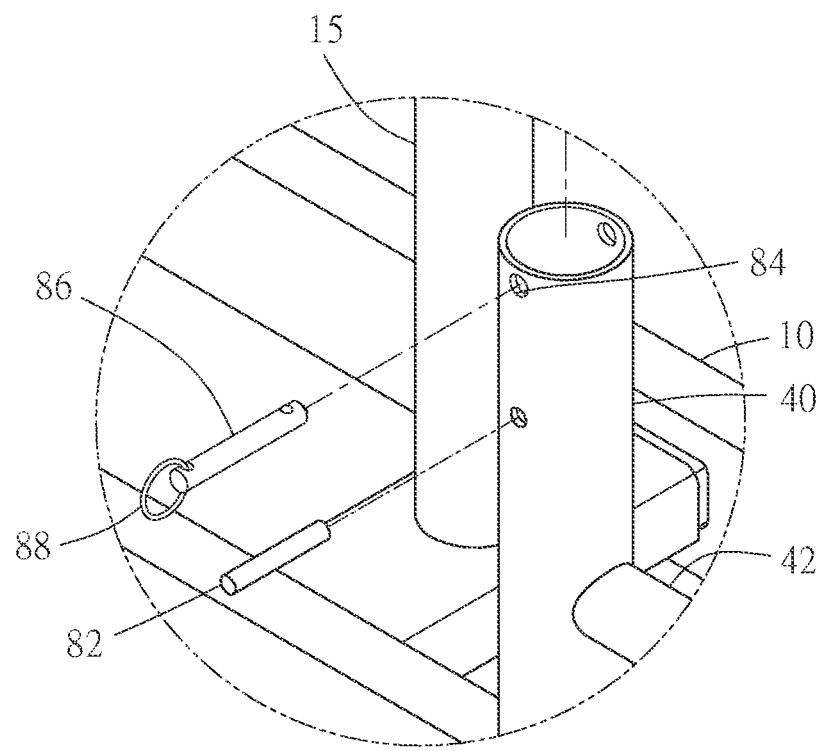
FIG. 3 is a partial enlarged view of FIG. 1, showing the limiting bars and the bolts.
Figure 4:
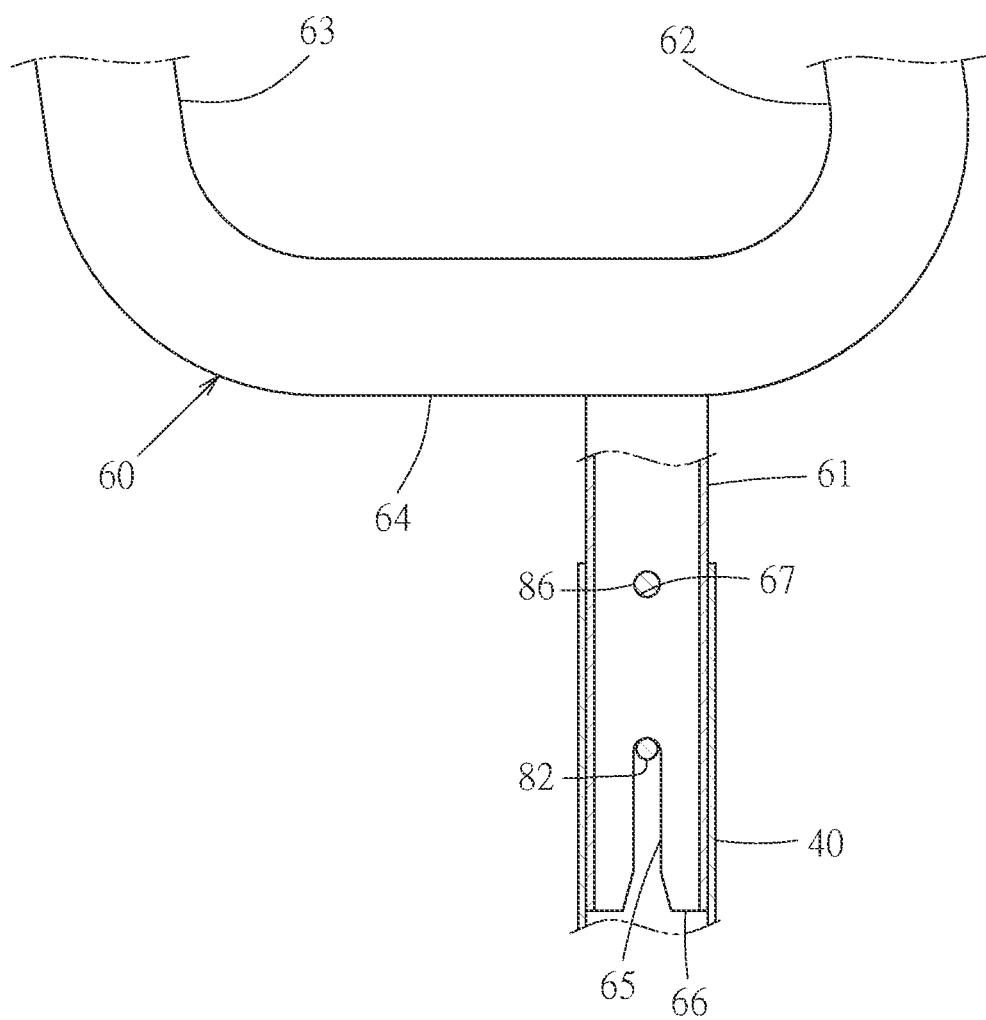
FIG. 4 is a partial sectional view of the operating parts and the first installing tubes of the preferred embodiment of the present invention.
Figure 5:
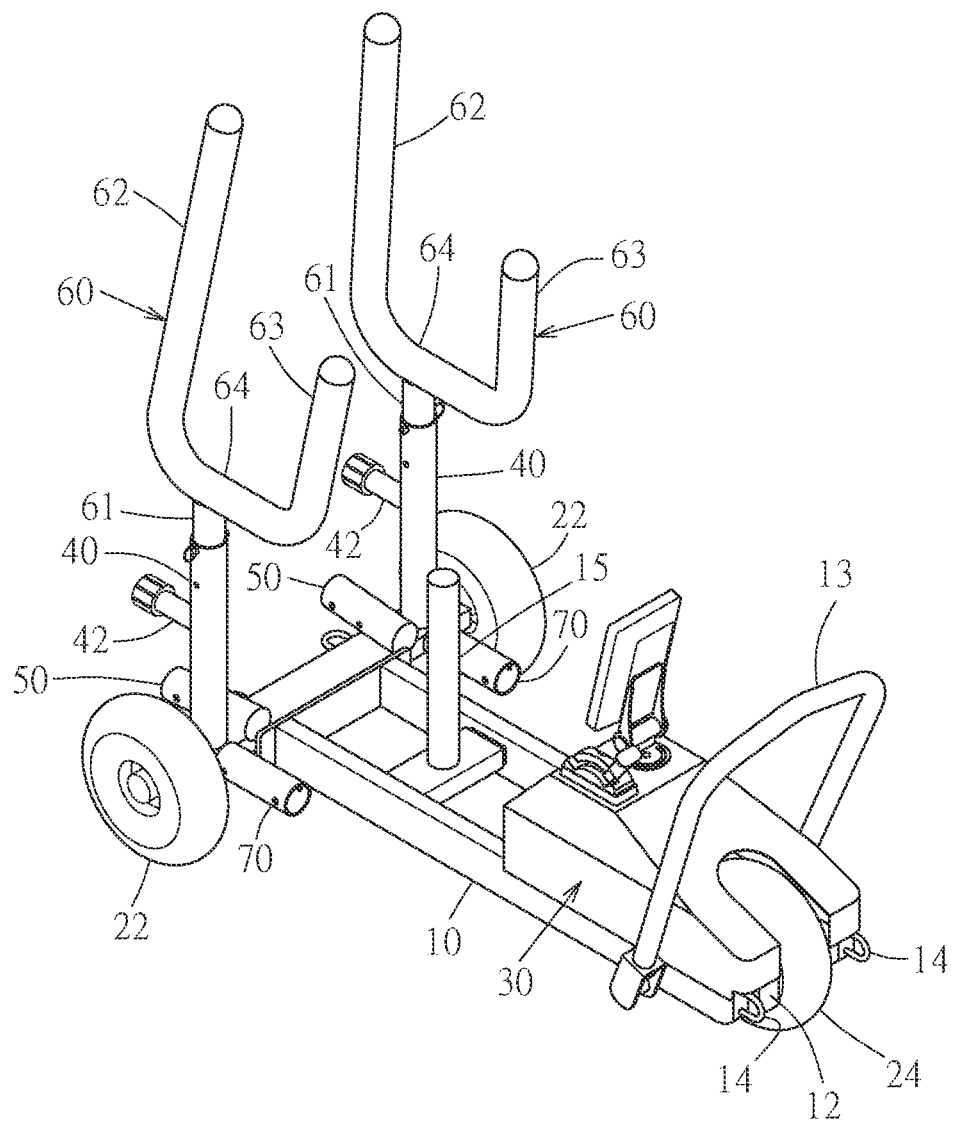
FIG. 5 is a perspective view of the preferred embodiment of the present invention from another angle, showing the usage state of the operating part installed on the first installing tube.

Depicted in FIG. 1 to FIG. 12 is a preferred embodiment of the weight training device that can be transformed into a hand truck, which includes a main frame 10, two first wheels 22, a second wheel 24, two first installing tubes 40, two second installing tubes 50 and two operating parts 60, wherein, one end of the main frame 10 is defined as first end 11, the other end of the main frame 10 is defined as second end 12. The first end 11 and the second end 12 are opposite each other. The main frame 10 can be loaded with at least one heavy object 91. As an example, the heavy objects 91 shown in the figures are cast iron discs. The heavy objects 91 can also be dumbbells or kettlebells, or other objects with sufficient loading weight for weight training.

The first wheels 22 are installed on both sides of the first end 11, capable of turning. The first wheels 22 are opposite each other. The second wheel 24 is installed on the middle portion of the second end 12. In this way, the main frame 10 can be moved along with the rolling of the first wheels 22 the second wheel 24.

The first installing tubes 40 are opposite each other in the lateral direction. The bottom end of the first installing tube 40 is connected to the first end 11. The top end of the first installing tube 40 extends upward with its tip end open. The second installing tubes 50 are opposite each other in the lateral direction. One end of the second installing tube 50 is connected to the first end 11. The other end of the second installing tube 50 extends away from the main frame 10 with its tip end open.

The operating parts 60 are opposite each other. Each of the operating parts 60 respectively includes an inserting portion 61 and a first operating portion 62, wherein said operating part 60 can optionally further include a second operating portion 63 and a connecting portion 64. The inserting portion 61 is inserted into each of the first installing tubes 40 or each of the second installing tubes 50, so that each of the operating parts 60 can be respectively installed on each of the first installing tubes 40 or each of the second installing tubes 50 to shift between different weight training modes. One end of the inserting portion 61 is connected to the connecting portion 64. The two ends of the connecting portion 64 are respectively connected to the first operating portion 62 and the second operating portion 63, so that the inserting portion 61 can be coupled respectively with the first operating portion 62 and the second operating portion 63 through the connecting portion 64. The first operating portion 62 and the second operating portion 63 are opposite each other, and the first operating portion 62 and the second operating portion 63 respectively extend away from the inserting portion 61. Thus, the user can selectively control the first operating portion 62 or the second operating portion 63 to carry out different forms of weight training.

In the present embodiment, the first operating portion 62 and the second operating portion 63 are both rectangular, and the length of the first operating portion 62 is larger than the length of the second operating portion 63. One end of the inserting portion 61 is optionally connected to the middle portion of the connecting portion 64, so that the operating part 60 is like a fork.

Figure 6:
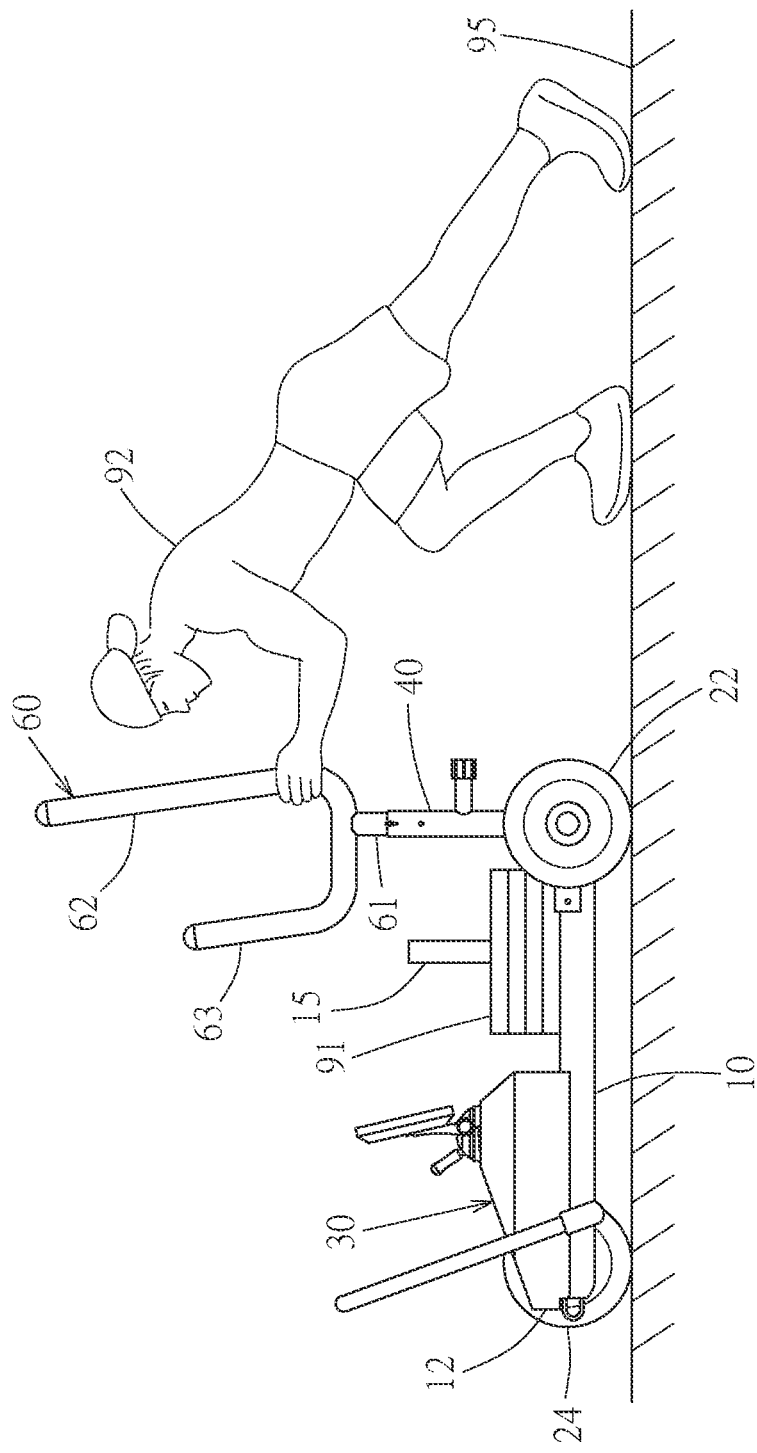
FIG. 6 is a side view showing the usage state of the preferred embodiment of the present invention.

As shown in FIG. 6, a plurality of heavy objects 91 are stacked on the main frame 10. Each of the operating parts 60 are selectively installed on the first installing tube 40. Each of the inserting portions 61 is respectively inserted into each of the first installing tube 40. The user 92 can use both hands to respectively grip each of the first operating portions 62 to push or pull each of the operating parts 60, so as to move the preferred embodiment, and to carry out weight training by using the weights of the main frame 10 as well as the heavy objects 91.

Figure 7:
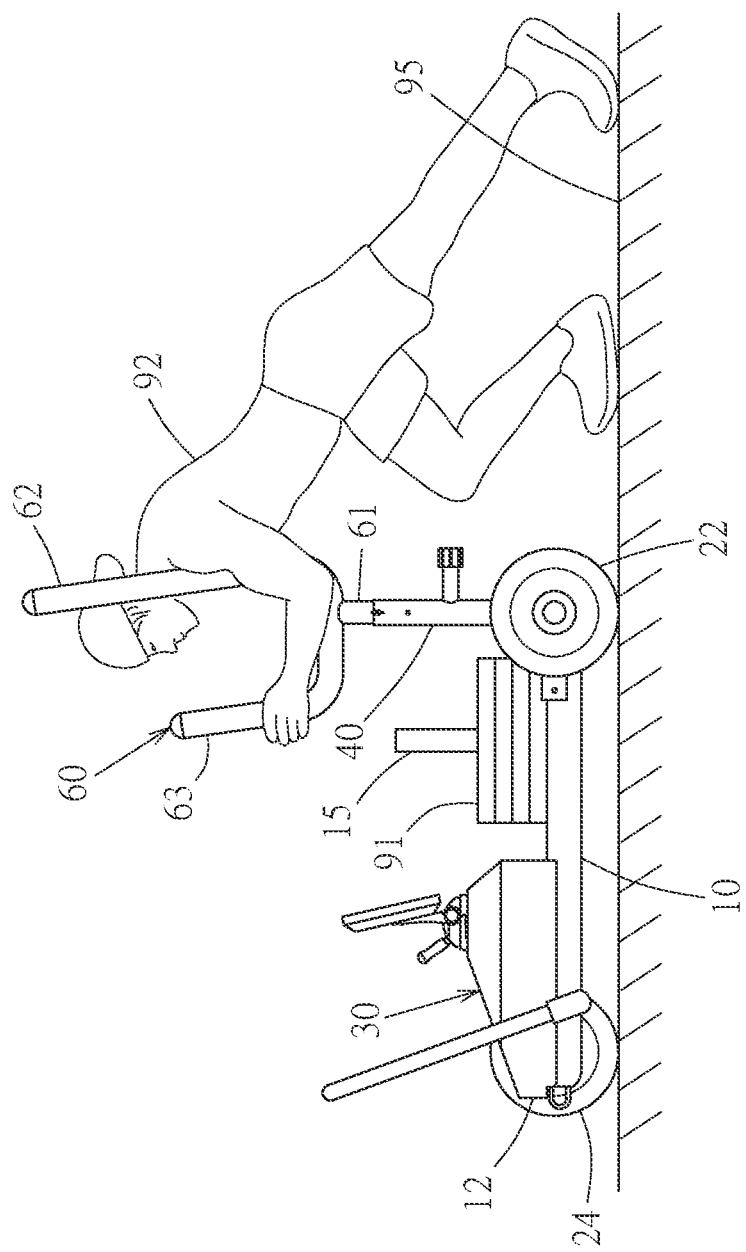
FIG. 7 is a side view showing the usage state of the preferred embodiment of the present invention.

As shown in FIG. 7, a plurality of heavy objects 91 are stacked on the main frame 10. Each of the operating parts 60 is selectively and respectively installed on each of the first installing tube 40. The user 92 can use both hands to grip each of the second operating portion 63, and support each of the first operating portions 62 respectively on the two shoulders of the user 92. By pushing the operating part 60, the preferred embodiment can move forward. Thus, using the weights of the main frame 10 and each of the heavy objects 91, a form of weight training different from what is shown in FIG. 6 can be carried out.

Figure 8:
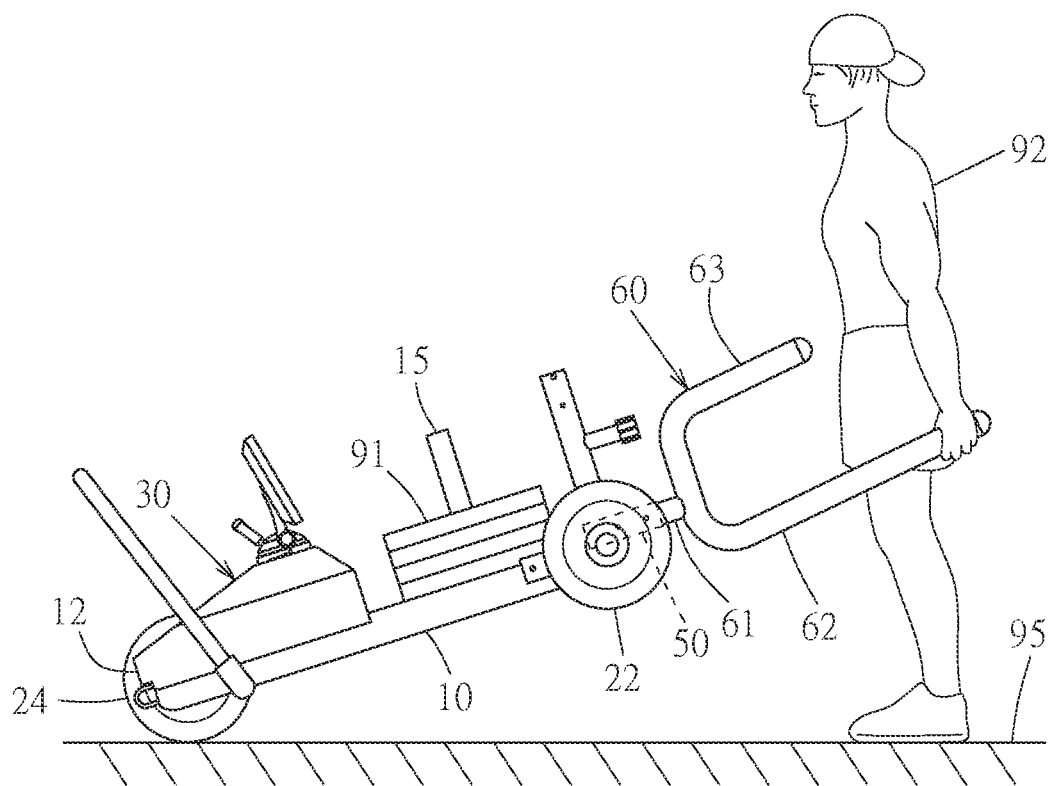
FIG. 8 is a side view showing the usage state of the preferred embodiment of the present invention.

As shown in FIG. 8, a plurality of heavy objects 91 are stacked on the main frame 10. The operating part 60 is selectively and respectively installed on each of the second installing tubes 50. The inserting portions 61 are respectively inserted into each of the second installing tubes 50. The user 92 can use both hands to grip each of the first operating portions 62. With the contact point between the second wheel 24 and the ground 95 as the pivot point, the user can lift each of the first operating portion 62 to force each of the first wheel 22 to leave the ground 95. Then, by pushing each of the operating parts 60, the preferred embodiment can be moved like a single-wheel hand truck. Based on the weights of the main frame 10 and the heavy objects 91, a form of weight training different from the examples shown in FIG. 6 and FIG. 7 can be carried out.

Based on different training needs, each of the operating parts 60 can be installed on each of the first installing tube 40 or each of the second installing tubes 50. Based on the overall structural form of the operating parts 60, the user 92 can selectively control the first operating portion 62 or the second operating portion 63 to carry out different forms of weight training.

The preferred embodiment further includes two third installing tubes 70, wherein the third installing tubes 70 are opposite each other in the lateral direction. Each of the third installing tubes 70 is respectively located between the first end 11 and the second end 12. One end of each third installing tube 70 is connected to the main frame 10. The other end of each third installing tube 70 is open, so that each of the operating parts 60 can be selectively installed on each of the third installing tubes 70 to save space for storage.

Figure 9:
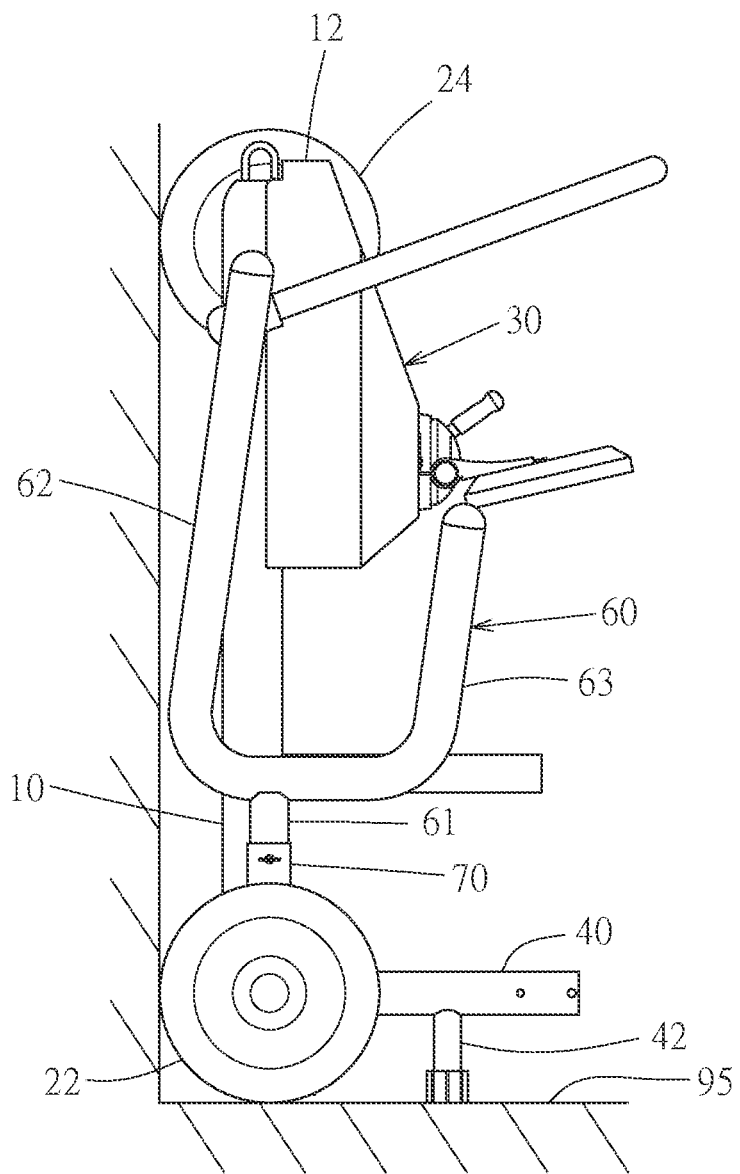
FIG. 9 is a side view showing the folded storage state of the preferred embodiment of the present invention.

As shown in FIG. 9, each of the operating parts 60 is selectively and respectively installed on each of the third installing tubes 70. Each inserting portion 61 is respectively inserted into each third installing tube 70, so that each operating part 60 is respectively located on either side of the main frame 10. Comparing to the usage state shown in FIG. 6 to FIG. 8, this can effectively reduce the overall space occupied by the preferred embodiment, facilitating storage of the preferred embodiment when it is not used.

Further, based on the configuration of the third installing tubes 70, each first installing tube 40 is respectively provided with a footing column 42. One end of each footing column 42 is respectively connected to the middle portion of the first installing tube 40. The other end of each footing column 42 respectively extends away from the second end 12. FIG. 9 shows the vertical storage state. The first end 11 faces downward. The second end 12 faces upward. In this way, the main frame 10 can stand on the ground. Each footing column 42 contacts the ground 95. Together with the first wheel 22, they provide support for the preferred embodiment to stand stably on the ground. Meanwhile, each operating part 60 can be respectively installed on each third installing tube 70. There is no need for an extra device to store each of the operating parts 60, and each operating part 60 does not need to be stored in different spaces. When it is needed to use the preferred embodiment, the user does not need to look for each of the operating parts 60. Therefore, the present invention is very convenient.

The inserting portion 61 is formed with a slot 65 in the radial direction. The end of the inserting portion 61 away from the connecting portion 64 is defined as end portion 66. One end of the slot 65 extends to the end portion 66. The other end of the slot 65 extends toward the connecting portion 64 along the axial direction of the inserting portion 61. A plurality of limiting bars 82 are respectively configured on each first installing tube 40, each second installing tube 50 and each third installing tube 70. Thus, when the inserting portion 61 is selectively inserted into each first installing tube 40, each second installing tube 50 or each third installing tube 70, the limiting bars 82 will go into the slots 65, so that each operating part 60 can not turn freely. This also provides convenience when the user 92 operates each of the operating parts 60.

The inserting portion 61 is provided with a first bolt hole 67 in the radial direction. Each first installing tube 40, each second installing tube 50 and each third installing tube 70 are respectively provided with a second bolt hole 84 in the radial direction. When the inserting portion 61 is selectively inserted into each first installing tube 40, each second installing tube 50 or each third installing tube 70, the two movable bolts 86 are respectively inserted into the first bolt holes 67 of the operating parts 60 and each bolt 86 respectively go through the corresponding second bolt hole 84. In this way, the operating part 60 can be fixed. The operating part 60 is limited and can not rotate freely. Such a design provides convenience when the user 92 operates the operating part 60. Meanwhile, the operating part 60 can not freely come out of each first installing tube 40, each second installing tube 50 and each third installing tube 70. The operating part 60 is positioned stably. One end of each bolt 86 is respectively configured with a movable circular ring 88, so that the user can conveniently pull the bolt 86 out of the first bolt hole 67 and the second bolt hole 84.

The limiting bar 82, the bolt 86 and the corresponding slot 65, the first bolt hole 67, and the second bolt hole 84 can be selectively configured as needed. The invention can be embodied with the limiting bar 82 but without the bolt 86, or with the bolt 86, but without the limiting bar 82.

Figure 10:
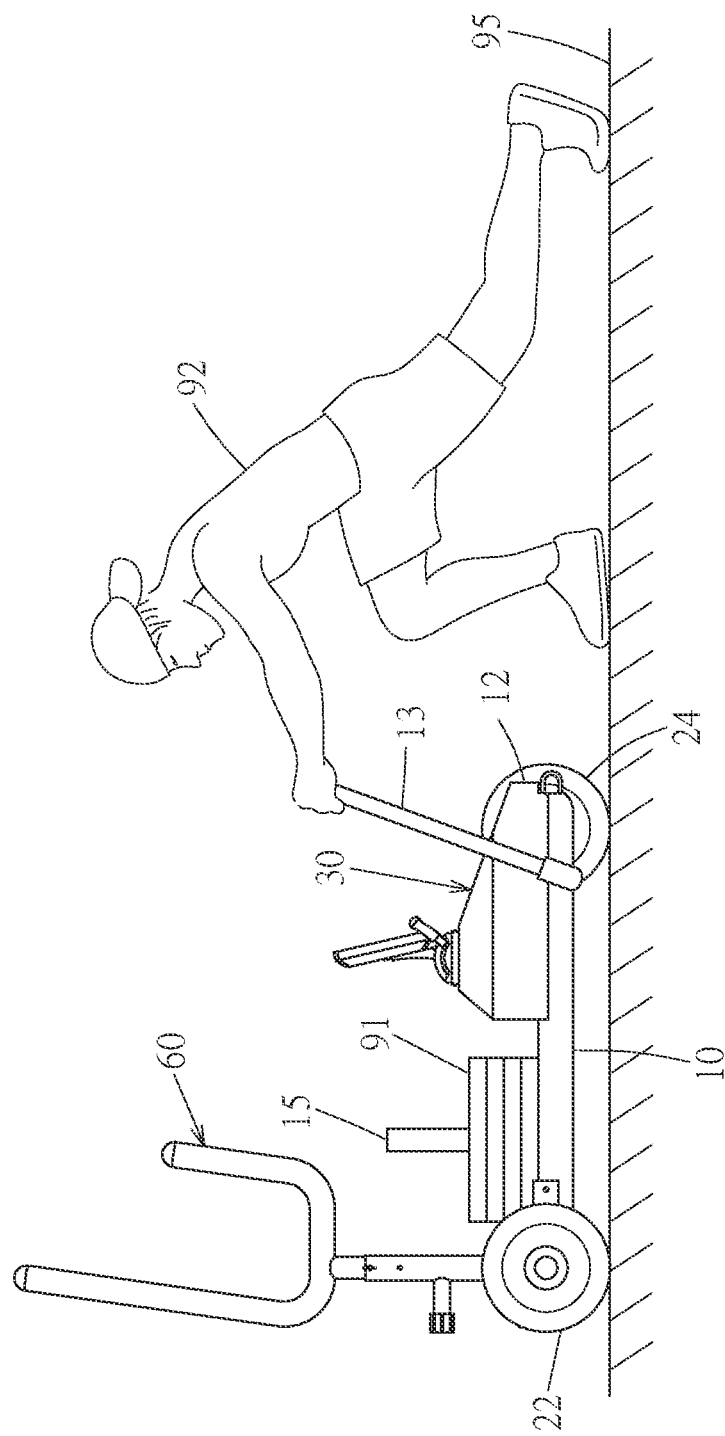
FIG. 10 is a side view showing the usage state of the preferred embodiment of the present invention.

The main frame 10 is configured with a holding portion 13. The holding portion 13 is located between the first end 11 and the second end 12, and the holding portion 13 is close to the second end 12. The holding portion 13 is in an arc form. The middle of the holding portion 13 extends upward. As shown in FIG. 10, the user 92 can selectively grip the holding portion 13 to push or pull the main frame 10 to move, so as to carry out the forms of weight training described in FIG. 6, FIG. 7, and FIG. 8.

Figure 11:
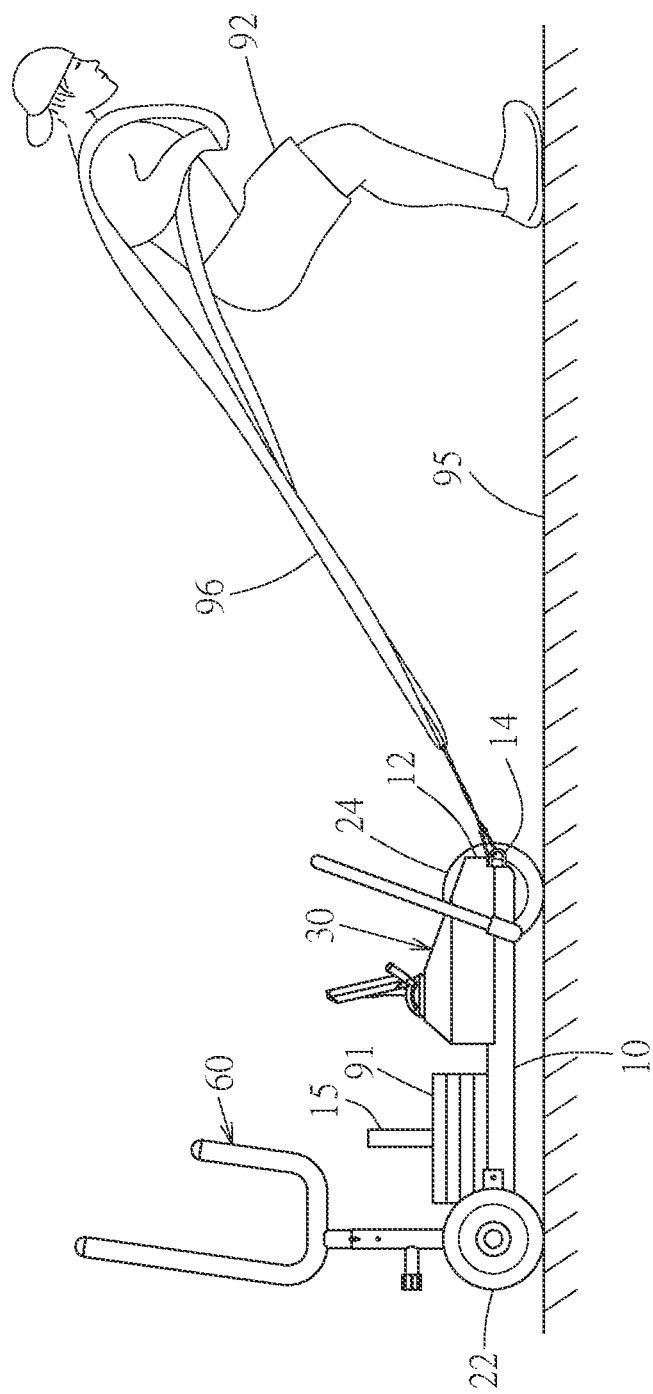
FIG. 11 is a side view showing the usage state of the preferred embodiment of the present invention.
Figure 12:
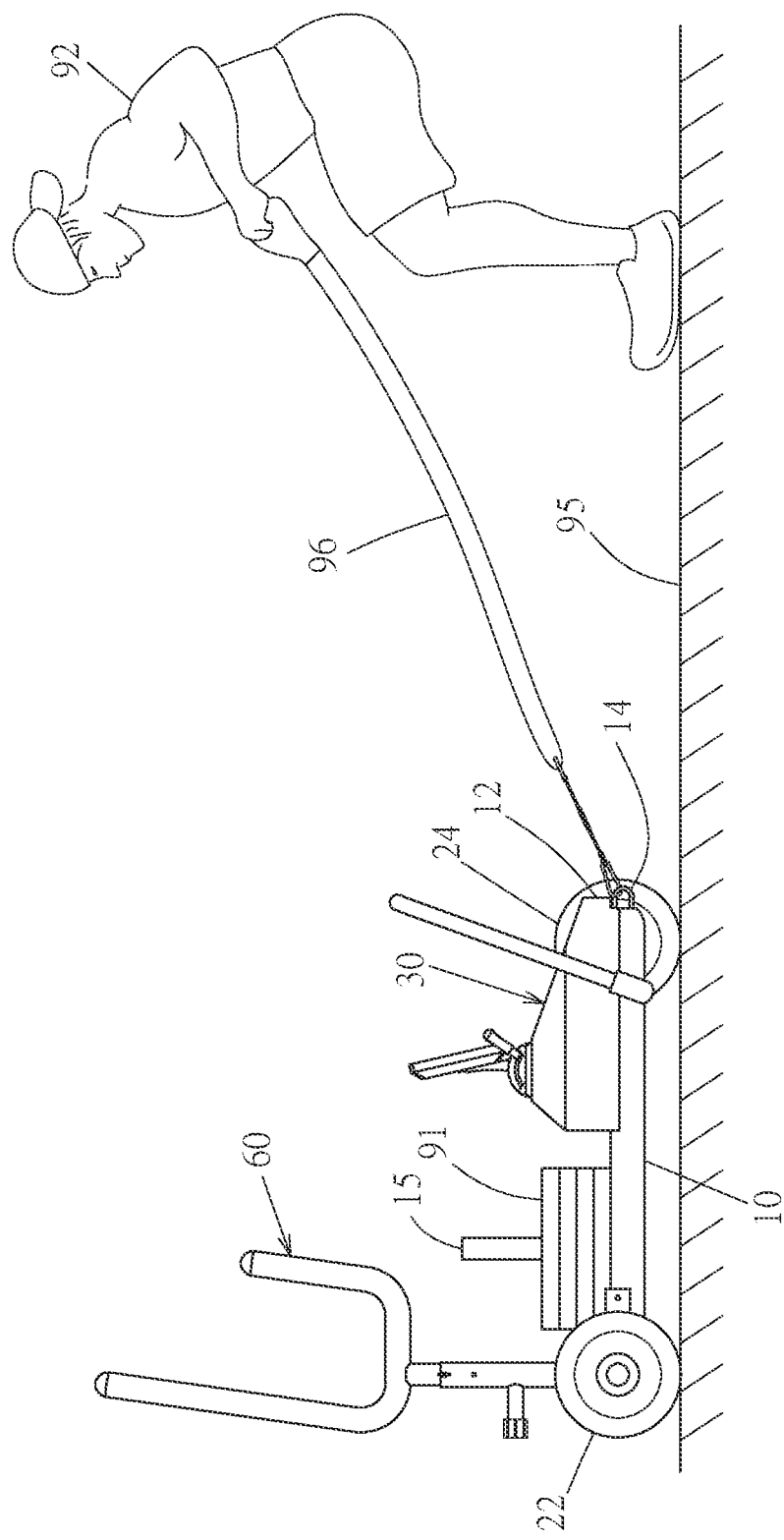
FIG. 12 is a side view showing the usage state of the preferred embodiment of the present invention.

The second end 12 is configured with two ring portions 14. As shown in FIG. 11, the two pulling ropes 96 are respectively connected to each of the ring portions 14, so that the main frame 10 can be pulled to move. As shown in FIG. 12, the preferred embodiment can also selectively use one pulling rope 96 to connect one ring portions 14, so that the main frame 10 can be pulled to move. The ring portions 14 are optionally configured. The number of the ring portions 14 can be increased or decreased as needed. In the options where the ring portions 14 are configured, the number of the ring portions 14 is at least one. Each ring portion 14 can also be configured with two corresponding pulling ropes 96. Based on the number of the ring portions 14, the configuration positions of the ring portions 14 on the main frame 10 can also be changed as needed. Depicted in the figures is only one feasible example and shall not be construed to limit the scope of the present invention.

A damping structure 30 is configured on the main frame 10. The damping structure 30 is connected to the second wheel 24, so as to provide a resistance against the rolling of the second wheel 24.

When using the preferred embodiment, the heavy object 91 can be provided or not provided. When the heavy object 91 is not provided, the overall weight of the preferred embodiment is used as the load for weight training.

The main frame 10 can selectively have a vertical bar 15. The bottom end of the vertical bar 15 is connected to the main frame 10. The top end of the vertical bar 15 extends upward, and the vertical bar 15 is located between the first end 11 and the second end 12, so that the vertical bar 15 can go through the heavy objects 91 to fix the heavy objects 91.

Figure 13:
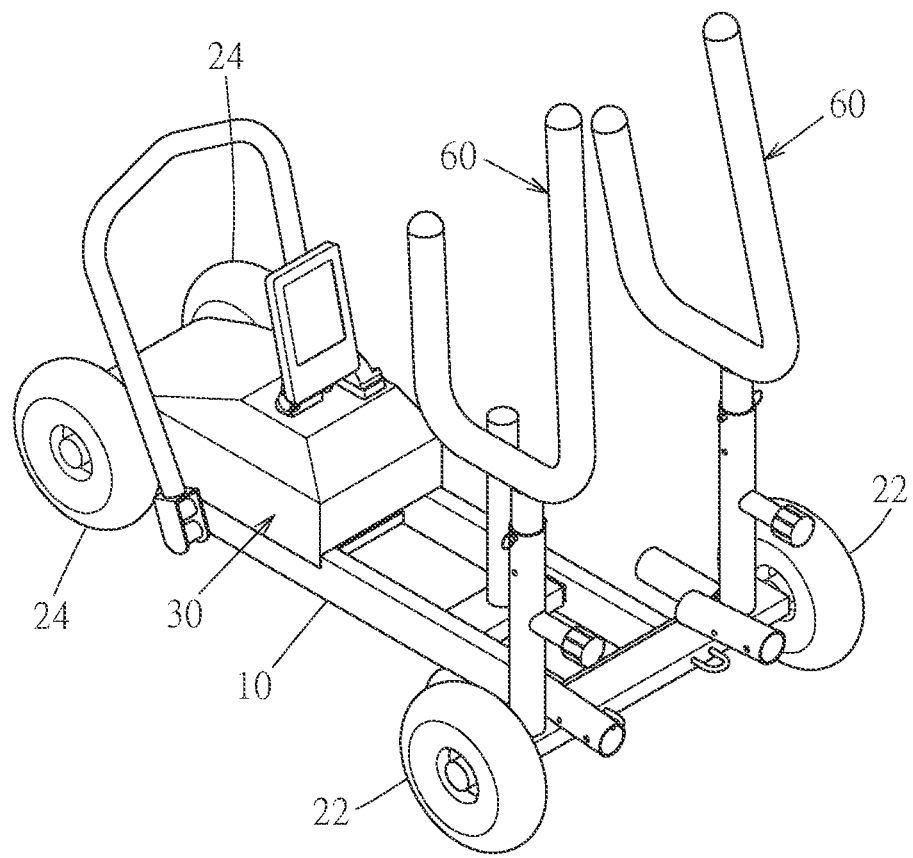
FIG. 13 is a perspective view of a varied embodiment of the present invention.

FIG. 13 shows a varied embodiment. It differs from the structure of the preferred embodiment in that it includes two second wheels 24, wherein the two second wheels 24 are opposite each other.

I claim:
1. A weight training device that transformable into a hand truck, the weight training device comprising:
   a main frame having a first end and a second end opposite the first end, said main frame adapted to receive at least one heavy object thereon;
   a pair of first wheels positioned at opposite sides respectively at the first end of said main frame, said pair of first wheels being rotatable;
   at least one second wheel positioned on the second end of said main frame, said main frame being movable by a rolling of said pair of first wheels and said at least one second wheel;
   a pair of first installing tubes arranged opposite to each other on said main frame, a bottom end of each first installment tube of said pair of first installing tubes being connected to the first end of said main frame, a top end of each first installing tube of said pair of first installing tubes extending upwardly and having an open tip end;
   a pair of second installing tubes arranged opposite to each other on said main frame, one end of each second installing tube of said pair of second installing tubes being connected to the first end of said main frame, another end of each second installing tube of said pair of second installing tubes extending away from said main frame and having an open tip end;
   a pair of operating parts arranged opposite to each other on said main frame, each operating part of said pair of operating parts having an inserting portion and a first operating portion, wherein the inserting portion and the first operating portion are coupled together, the inserting portion being insertable into each first installing tube of said pair of first installing tubes or into each second installing tube of said pair of second installing tubes such that each operating part of said pair of operating parts is selectively configured on each first installing tube or each second installing tube;

a damping structure positioned on said main frame, said damping structure being connected to said at least one second wheel;

a pair of third installing tubes extending vertically and arranged opposite to each other on said main frame, each third installing tube of said pair of third installing tubes being located between the first end and the second end of said main frame, one end of each third installing tube of said pair of third installing tubes being connected said main frame, an opposite end of each third installing tube of said pair of third installing tubes being open such that each operating part of said pair of operating parts is respectively installable on each third installing tube of said pair of third installation tube; and wherein each first installing tube of said pair of first installing tubes has a footing column, one end of the footing column is respectively connected to a middle portion of each first installing tube of said pair of first installing tubes, an opposite end of the footing column extending away from the second end of said main frame such that said main frame is storable in a standing form, wherein the footing column and said pair of first wheels support said main frame stably in the standing form.

2. The weight training device of claim 1, wherein the inserting portion has a slot extending in a radial direction, one end of the inserting portion is an end portion, the slot has an end extending to the end portion, wherein a plurality of limiting bars are respectively configured on each first installing tube of said pair of first installing tubes and on each second installing tube of said pair of second installing tubes such that the plurality of limiting bars can enter the slot so as to limit rotation of the pair of operating parts.

3. The weight training device of claim 2, wherein the inserting portion has a first bolt hole, each first installing tube of said pair of first installing tubes and each second installing tube of said pair of second installing tubes respectively having a second bolt hole, wherein a pair of moveable bolts respectively extend through the first bolt hole, each movable bolt of the pair of movable bolts is extendable through the corresponding second bolt hole, one end of each movable bolt of the pair of movable bolts has a movable circular ring.

4. The weight training device of claim 1, wherein the inserting portion has a first bolt hole, each first installing tube of said pair of first installing tubes and each second installing tube of said pair of second installing tubes respectively having a second bolt hole, wherein a pair of moveable bolts respectively extend through the first bolt hole, each movable bolt of the pair of movable bolts is extendable through the corresponding second bolt hole, one end of each movable bolts of the pair of movable bolt has a movable circular ring.

5. The weight training device of claim 1, wherein each operating part of said pair of operating parts has a second operating portion and a connecting portion, one end of the inserting portion is connected to the connecting portion, opposite ends of the connecting portion being respectively connected to the first operating portion and the second operating portion, wherein the first operating portion and the second operating portion are opposite to each other, the first operating portion and the second operating portion respectively extending away from the inserting portion.

6. The weight training device of claim 1, wherein said main frame has a holding portion adjacent the second end of said main frame, the holding portion having an arc shape, wherein a middle of the holding portion extends upwardly.

7. The weight training device of claim 1, wherein the second end of said main frame has at least one ring portion, the at least one ring portion adapted to receive a pull rope.

8. The weight training device of claim 1, wherein said at least one second wheel has two second wheels opposite each other.

* * * * *